(12) United States Patent
Sunstrum

(10) Patent No.: US 9,996,314 B2
(45) Date of Patent: Jun. 12, 2018

(54) AUDIO CONTROL APPARATUS AND HEADSET SYSTEM FOR INTEGRATING PERSONAL ELECTRONIC DEVICES

(71) Applicant: Martin T. Sunstrum, Calgary (CA)

(72) Inventor: Martin T. Sunstrum, Calgary (CA)

( * ) Notice: Subject to any disclaimer, the term of this patent is extended or adjusted under 35 U.S.C. 154(b) by 0 days. days.

(21) Appl. No.: 15/397,387

(22) Filed: Jan. 3, 2017

(65) Prior Publication Data

US 2017/0192745 A1 Jul. 6, 2017

(30) Foreign Application Priority Data

Jan. 5, 2016 (CA) ..................................... 2916697

(51) Int. Cl.
*H04R 1/10* (2006.01)
*G06F 3/16* (2006.01)
(Continued)

(52) U.S. Cl.
CPC ............. *G06F 3/165* (2013.01); *H04B 1/385* (2013.01); *H04R 1/1041* (2013.01);
(Continued)

(58) Field of Classification Search
CPC .. H04R 1/1041; H04R 5/033; H04R 2420/07; H04R 1/1008; H04R 2420/09;
(Continued)

(56) References Cited

U.S. PATENT DOCUMENTS 6,006,115 A 12/1999 Wingate
7,149,552 B2 12/2006 Lair
(Continued)

FOREIGN PATENT DOCUMENTS

CN 201160277 Y 12/2008
CN 201252543 Y 6/2009
(Continued)

OTHER PUBLICATIONS

KEL52, "SHREDZ—Snow Helmet Audio Reinvented by KEL52"; posted on Kickstarter; Nov. 21, 2014.
(Continued)

*Primary Examiner* — Paul S Kim
(74) *Attorney, Agent, or Firm* — ATMAC Patent Services Ltd.; Andrew T. MacMillan

(57) ABSTRACT

An audio control apparatus particularly suited for an active outdoor type of person integrates multiple electronic devices. Audio source devices can include a mobile phone, a music player, and a walkie talkie. Audio sink devices can include a video recorder. The audio signals from the audio source devices may be mixed and sent to the video recorder to capture live audio signals. The user controls the audio control apparatus using either integrated or external UI buttons, which are context specific, configurable and allow control of the external devices from a single UI. External UI buttons may be mounted to a helmet or another easy to access location. A USB port on the external UI allows charging the audio control apparatus without needing to access or otherwise disturb the apparatus while it is nicely positioned within the helmet.

20 Claims, 5 Drawing Sheets

(51) Int. Cl.
*H04W 4/00* (2018.01)
*H04B 1/3827* (2015.01)
*H04W 4/10* (2009.01)
H04R 1/02 (2006.01)
*H04R 5/033* (2006.01)

(52) U.S. Cl.
CPC ............ *H04W 4/008* (2013.01); *H04W 4/10* (2013.01); *H04B 2001/3866* (2013.01); *H04R 1/028* (2013.01); *H04R 1/1008* (2013.01); *H04R 5/033* (2013.01); *H04R 2201/023* (2013.01); *H04R 2420/07* (2013.01); *H04R 2420/09* (2013.01); *H04R 2430/01* (2013.01)

(58) Field of Classification Search
CPC ............... H04R 2430/01; H04R 1/028; H04R 2201/023; G06F 3/165; H04W 4/008; H04W 4/10; H04B 1/385; H04B 2001/3866
USPC .......................................................... 381/74
See application file for complete search history.

(56) References Cited

U.S. PATENT DOCUMENTS 8,121,547 B2    2/2012   Findlay et al.
2009/0047905 A1  2/2009   Yang
2010/0150383 A1* 6/2010   Sampat .................... H04R 1/10
                                                   381/311

FOREIGN PATENT DOCUMENTS

| | | |
|---|---|---|
| CN | 201523706 U | 7/2010 |
| CN | 202535356 U | 11/2012 |
| CN | 203840328 U | 9/2014 |
| CN | 203896339 U | 10/2014 |
| CN | 204103920 U | 1/2015 |
| CN | 204467052 U | 7/2015 |
| WO | 2003056790 A1 | 7/2003 |

OTHER PUBLICATIONS

Sena Technologies Inc., "Bluetooth Audio Pack"; Copyright 2015.
KEL52; "SHREDZ Helmet Audio Kit for skiers/snowboarders now on Kickstarter. Interested in feedback from the headphone community"; posted on reddit.com; Nov. 27, 2014.
Sena Technologies Inc., "SNOWTALK Bluetooth Headset & Intercom"; Copyright 2015.
Sena Technologies Inc., "SR10 Bluetooth Two-way Radio Adapter"; copyright 2015.

* cited by examiner

AUDIO CONTROL APPARATUS AND HEADSET SYSTEM FOR INTEGRATING PERSONAL ELECTRONIC DEVICES

CROSS-REFERENCE TO RELATED APPLICATIONS

This application claims the benefit of priority of Canadian Patent Application No. 2,916,697 filed Jan. 5, 2016, which is incorporated herein by reference.

BACKGROUND OF THE INVENTION (1) Field of the Invention

The invention pertains generally to audio headsets utilized by outdoor enthusiasts, who may be hiking, biking, or skiing for example. More specifically, the invention relates to dynamically controlling multiple electronic devices such as music players, video recorders, mobile phones, headsets, and walkie talkies from a single user interface (UI) and rerouting and controlling media signals between these devices in real time.

(2) Description of the Related Art

It is becoming increasingly popular for outdoor enthusiast to carry multiple personal electronic devices when hiking, biking, skiing, and performing other recreational activities.

Outdoor enthusiasts often record video of their recreational activities using high definition (HD) video recording devices such as the well-known GoPro™ video recorder. One problem with recording video of outdoor activities is the lack of ability to record from multiple audio sources. Another problem is the significant time required afterwards to edit and post-produce the recordings. A video recorder often does not do a high-quality job of capturing ambient sounds during adventure activities, instead capturing wind sounds and other undesirable noise. To make the video more exciting and representative of the actual activity, the user is forced to spend hours in front of a computer manually performing a post-production editing process. Time spent in front of a computer may be considered wasted by a person who would rather be out enjoying another physical activity.

Other electronic devices that are often carried include cell phones and music players, which may be the same device acting in a dual role. These devices may be coupled via a wireless protocol such as Bluetooth to a headset worn by the user to allow hands free listening to music, taking phone calls making voice commands (e.g., Siri®), etc. As many remote locations do not have cellular service, another device that many outdoor enthusiasts carry is a walkie talkie. For adventure activities with potential of getting lost or separated from a group (e.g., heli-skiing with significant avalanche risk), other electronic safety devices may be required such as electronic beacons and tracking devices.

Carrying so many electronic devices while engaged in an outdoor activity presents several problems. For instance, it is possible to miss a walkie talkie call because the user is listening to music. A child listening to music on the ski hill can easily miss a walkie talkie call from their parent. This may cause unnecessary concern for the parent and wasted emergency response resources when the child is not actually in an emergency. In an actual emergency, the parent may dismiss the lack of response from their child since previously the lack of response happened because the child didn't notice the call.

Another problem is users must press numerous buttons on numerous devices to control of all their devices. Each device may have a separate user interface and thus each device may need to be fully accessible to the user during the activity. This is especially inconvenient when desired electronic devices such as mobile phones are not physically capable of extreme conditions such as cold and wet that may be required for some sports.

Some devices like walkie talkies are bulky and awkward to mount externally on a user for convenient access. These devices would be better located out of the way such as within a backpack; however, if located within a backpack the user may not hear alerts and even if heard would still need to take the device out of its storage location to press buttons such as the push-to-talk (PTT) button on a walkie talkie. The PTT button is frequently located on the walkie body itself; upon the requirement to communicate, the user must grasp the device and depress the PTT button. Even if the PTT button is located on another device such as an external microphone/speaker that can be clipped to a user's chest, the user still must push different buttons when talking on different devices. For instance, the user's mobile phone stored in their pocket will have a different UI than the walkie talkie. As the number of separate devices increases, the multiple UI problem gets worse.

BRIEF SUMMARY OF THE INVENTION

According to an exemplary embodiment of the invention there is disclosed an audio control apparatus including one or more communication interfaces coupled to an audio source device, an audio sink device, a speaker, and a microphone. The apparatus further includes one or more processors coupled to the one or more communication interfaces. The one or more processors are operable to receive an audio signal representing audio from the audio source device, transmit the audio signal to the speaker, transmit the audio signal to the audio sink device, receive a microphone signal representing audio from the microphone, and transmit the microphone signal to the audio sink device in response to receiving an activation signal.

According to another exemplary embodiment of the invention there is disclosed an audio control apparatus including one or more communication interfaces for coupling to an audio music player, an audio sink device, a speaker, a microphone, and a user interface (UI). The apparatus further includes one or more processors coupled to the one or more communication interfaces. The one or more processors are operable to receive a play signal from the user interface; transmit a play command to the audio music player in response to receiving the play signal; receive a music signal representing music sent from the audio music device in response to the play command; transmit the music signal to the speaker; receive a microphone signal representing audio from the microphone; mix the microphone signal and the music signal together to form a mixed audio output signal; and transmit the mixed audio output signal to the audio sink device.

According to yet another exemplary embodiment of the invention there is disclosed an audio control apparatus including one or more communication interfaces for coupling to an audio source device; a radio transceiver; a speaker; a microphone; and a user interface (UI). The apparatus further includes one or more processors coupled to the one or more communication interfaces. The one or more processors are operable to receive a start signal from the user interface; transmit a start command to the audio source device in response to receiving the start signal; receive a first audio signal representing audio sent from the audio source device in response to the start command; transmit the first audio signal to the speaker; receive a second audio signal representing audio from the radio transceiver; transmit the second audio signal to the speaker; and pass a microphone signal representing audio from the microphone along with a push-to-talk command to the radio transceiver in response to receiving a push-to-talk signal from the user interface. Upon receiving the push-to-talk command, the radio transceiver transmits the microphone signal over the air.

According to yet another exemplarily embodiment of the invention there is disclosed a headset system. The system includes a speaker, a microphone, a first communication interface for communicating with an audio source device, a second communication interface for communicating with a walkie talkie, and a third communication interface for transmitting audio to an external microphone input of a video recorder. The system further includes a user interface accessible by a user of the headset system, and one or more processors coupled to the speaker, the microphone, the first communication interface, the second communication interface, the third communication interface, and the user interface. The one or more processors are operable to send audio received from the audio source device, the microphone, and the walkie talkie to the speaker and the video recorder. The one or more processors are further operable to send audio received from the microphone to the walkie talkie and send a push-to-talk command to the walkie talkie in response to user input received at the user interface.

According to yet another exemplarily embodiment of the invention there is disclosed an audio control apparatus that, when transmitting to an audio sink device, creates a conversation effect by sending a first audio signal to the audio sink device on a first audio channel and ensuring that the first audio signal on the first audio channel has a higher amplitude than any amplitude of a second audio signal that is sent to the audio sink device on the first audio channel; sending the second audio signal to the audio sink device on a second audio channel and ensuring that the second audio signal on the second audio channel has a higher amplitude than any amplitude of the first audio signal that is sent to the audio sink device on the second audio channel; the first audio signal is the audio signal received from the audio source device; and the second audio signal is the microphone signal received from the microphone.

Advantages of some embodiments include providing a solution for the monotonous task of post-production of recorded video. The user can record the music they are listening to at the time of their activity they're recording, and additionally record their own voice, providing a live action sound track at the time of the video recording, saving hours of post-production. Post-production not only takes time, but also misses 'the moment' and voice overs are different than recording the live action as it happens. The live audio includes voices of both local and remote parties on phone calls, other people on the walkie talkie channel, the user themselves when the mic is activated, music from the music player, and all other sounds played to the user on the speakers. The entirety of these incoming audio sources or any subset thereof may advantageously be captured and recorded on the external media sink devices either mixed together from different sources or with certain sources taking preference over other sources. The programmable user interface (UI) may advantageously allow the user to click a hard or soft button on their headset to begin sending the audio signal from the audio output of their headset to a GoPro™ Likewise, the UI may also advantageously allow the user to activate the PTT on their walkie and control other connected devices.

Advantages of some embodiments include allowing interconnection of walkie talkie with wireless headset while using existing audio transducers already present in the wireless headset, and using a wireless headset button to activate talking on the walkie talkie. Convenience is increased to handle both smartphone conversations plus walkie talkie conversations in the same wireless headset.

These and other advantages and embodiments of the present invention will no doubt become apparent to those of ordinary skill in the art after reading the following detailed description and preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
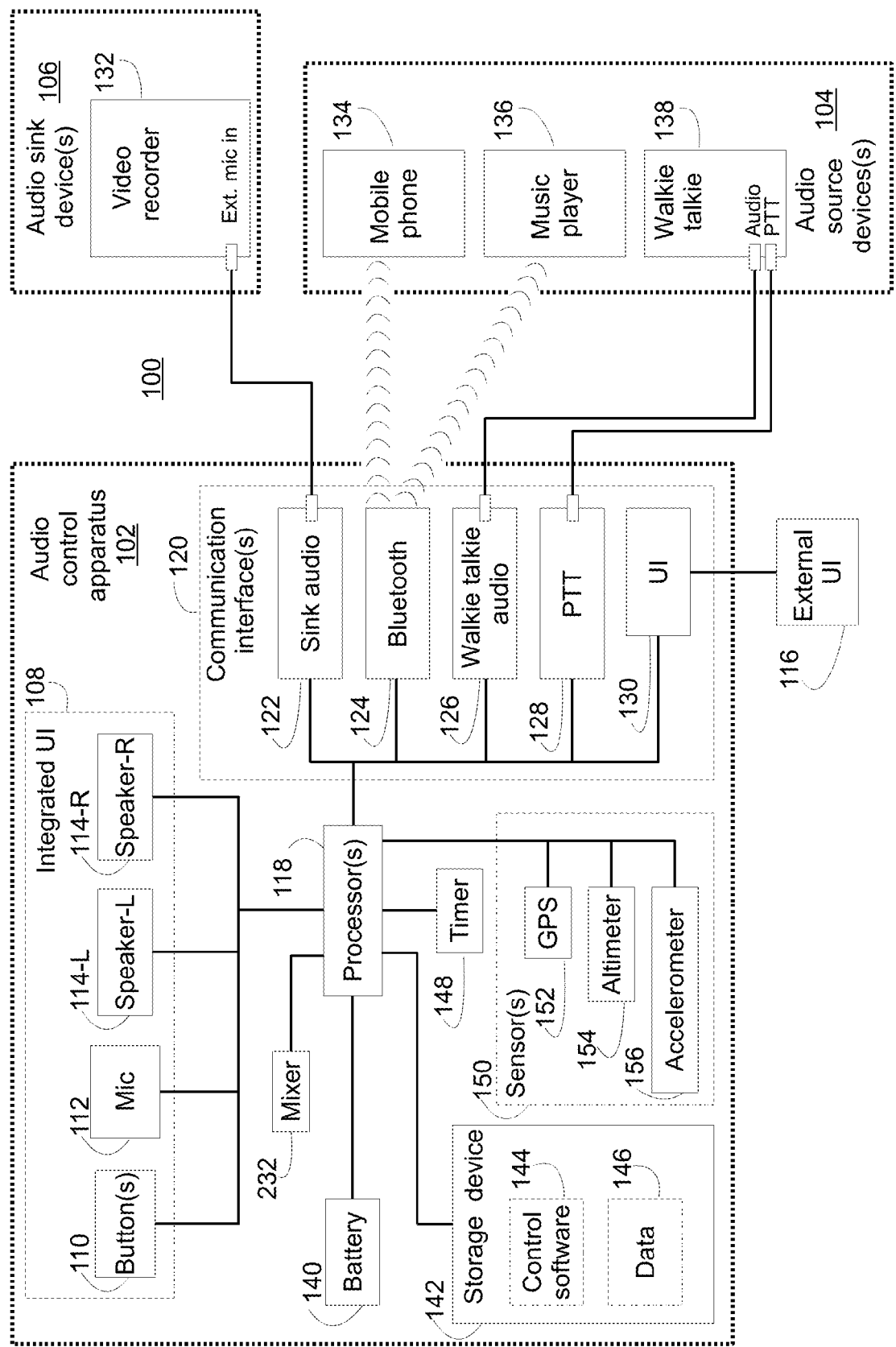
FIG. 1 shows a block diagram of a system having components within and coupled to an audio control apparatus according to an exemplary embodiment of the invention.

FIG. 1 shows a block diagram of a system 100 having components within and coupled to an audio control apparatus 102 according to an embodiment of the invention. The system 100 includes one or more audio source devices 104 and audio sink devices 106 coupled to the audio control apparatus 102. Although shown separated in FIG. 1, some audio source devices 104 may also sink audio and some audio sink devices 106 may also source audio—i.e., some devices may both provide and accept audio at different times and/or in different modes. The audio control apparatus 102 includes an integrated user interface (UI) 108, which is made up of button(s) 110, a microphone (mic) 112, and left and right speakers 114. An external UI 116 including similar components may optionally be coupled to the audio control apparatus.

The audio control apparatus 102 further includes one or more processor(s) 118 connected to one or more communication interface(s) 120. The interfaces 120 in this example include a sink audio interface 122, a Bluetooth interface 124, a walkie talkie audio interface 126, a walkie talkie push-to-talk (PTT) interface 128, and a UI interface 130. In this example, the sink audio interface 122 is an audio output port for connecting to audio sink device(s) 106 such as a GoPro™ video recorder 132. The Bluetooth interface 124 is a wireless module for wirelessly connecting via the Bluetooth protocol to external devices such as mobile phones 134 and music players 136. The mobile phone 134 of FIG. 1 may be an iPhone™ and the music player 136 may be an iPod™. The walkie talkie audio interface 126 includes one or more ports connecting via cable(s) to corresponding audio port(s) on the walkie talkie 138. The PTT interface 128 connects to the PTT port on the walkie talkie 138 for controlling the transmit function of the walkie talkie 138. The UI interface 130 connects to the external UI 116.

In the following description, the singular form of the word "processor" will be utilized as it is common for an embedded CPU of a portable computing device to have a single processor (sometimes also referred to as a core); however, it is to be understood that multiple processors may also be configured to perform the described functionality in other implementations.

As shown in FIG. 1, the processor 118 is connected to and powered by a power source such as a direct current (DC) battery 140. The processor 118 is also connected to a storage device 142, which provides control software 144 and data 146. With the control software 144 and data 146 loaded, the processor 118 is able to interact with other components such as a timer 148 and sensors 150 including global positioning system (GPS) 152, altimeter 154, and an accelerometer 156.

Figure 2:
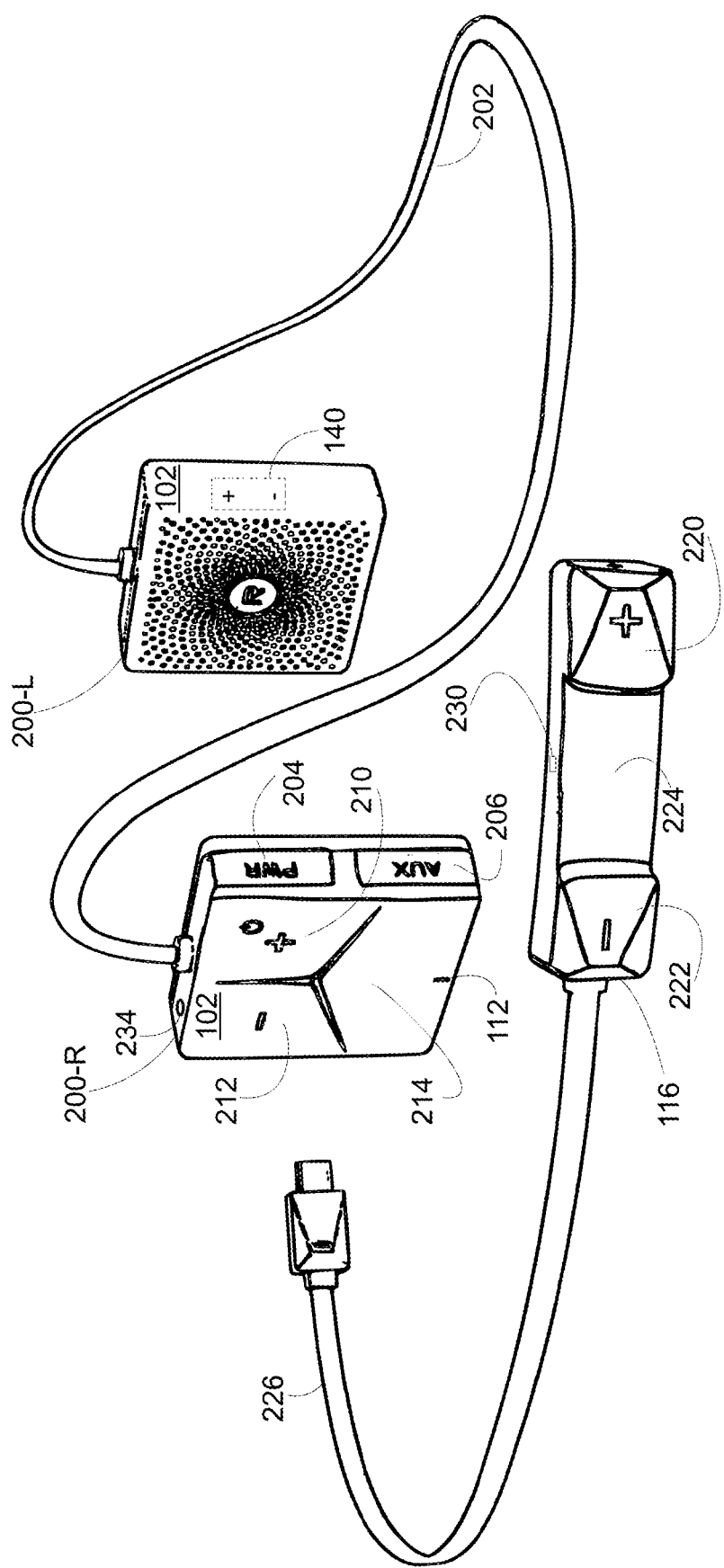
FIG. 2 shows the audio control apparatus housed in an enclosure shaped as a headset worn by a user.

FIG. 2 shows the audio control apparatus 102 housed in enclosures shaped as a headset with left and rights parts 200-L, 200-R. The UI button(s) 110, mic 112, and right-side speaker 114 are located on the right-side part 200-R. The battery 140 and left-side speaker 114 are provided on the left-side part 200-R. The two side parts 200-L, 200-R are connected by a headset cable 202. Three integrated UI buttons 110 are shown including a volume up button 210, a volume down button 212, and a context specific button 214. A power port 204 for charging battery 140 and an auxiliary port 206 are included on the right-side part 200-R. The auxiliary port 206 corresponds to and provides the pins for the walkie talkie audio interface 126 and PTT interface 128. An audio output port 234 is also provided on the headset right-side part 200-R and corresponds to the sink audio interface 122. FIG. 2 further shows an external UI 116 including three external UI buttons being a volume up button 220, a volume down button 222, and a center button 224. The buttons 220, 222, 224 are context sensitive and have different operations depending on the state of the audio control apparatus 102 at the time the button is pressed. The external UI 116 includes a USB cable 226 with a connector that plugs in to a port for the UI interface 130 (not visible in FIG. 2 but located on the right side part 200-R adjacent the volume down button 212). External UI 116 allows easy access to external buttons when the left and right headset parts 200-L, 200-R may be inconvenient to access such as when installed in certain helmet styles. For example, full face helmets can be worn with the audio control apparatus 102 because the external UI 116 can be mounted on the outside of the helmet where the external UI buttons 220, 222, 224 are easy to reach.

Figure 3:
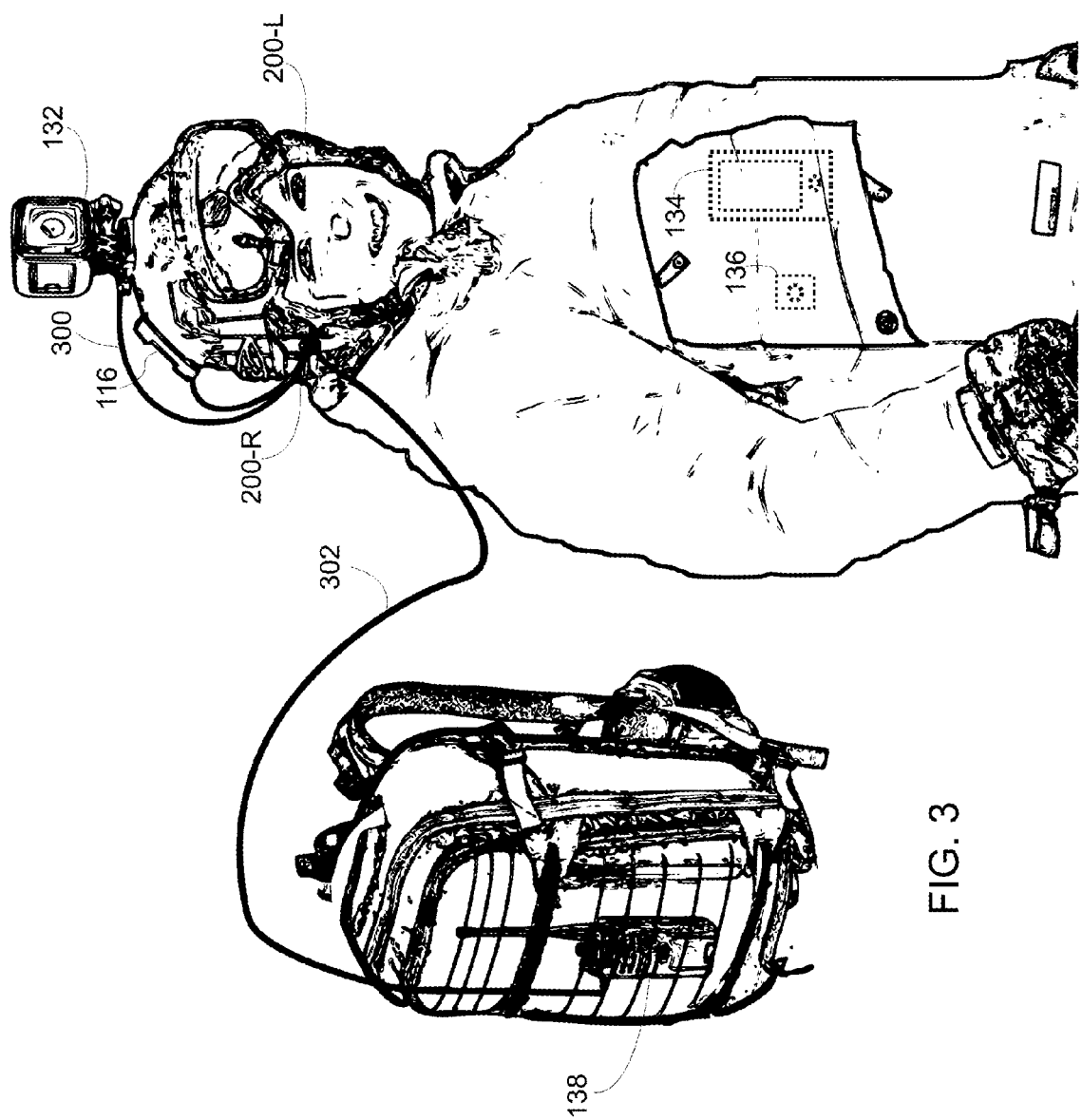
FIG. 3 shows a user wearing a helmet with the headset of FIG. 2 installed inside the helmet.

FIG. 3 shows a user ready to engage in an outdoor activity—in this case downhill skiing—while wearing a ski helmet with the headset parts 200-L, 200-R of FIG. 2 installed inside the helmet lining. On top of the user's helmet is a video recorder 132 such as a GoPro™. The video recorder 132 acts as an audio sink device 106, and the sink audio interface 122 of the audio control apparatus 102 is connected to an external audio input port on the video recorder 132 by wired connection 300. The external audio input port may be at mic or line levels as required. The user's walkie talkie 138 is connected via a wired connection 302 to the auxiliary port 206, which connects internally to the walkie talkie audio interface 126 and PTT interface 128. The walkie talkie 138 is stored tucked away within the user's backpack. The user also has a mobile phone 134 and a music player 136 such as an iPod™ in their breast pocket, and these devices 134, 136 are wirelessly connected to the audio control apparatus 102 via the Bluetooth interface 124. The user is able to interact with the audio control apparatus 102 via the external UI 116, which is mounted on the right outer side of the user's helmet. With the user's various electronic communication devices 132, 134, 136, 138 connected to one-another via the audio control apparatus 102, coordinated control of each of these devices 132, 134, 136, 138 is possible and media signals can be shared between them.

Figure 4:
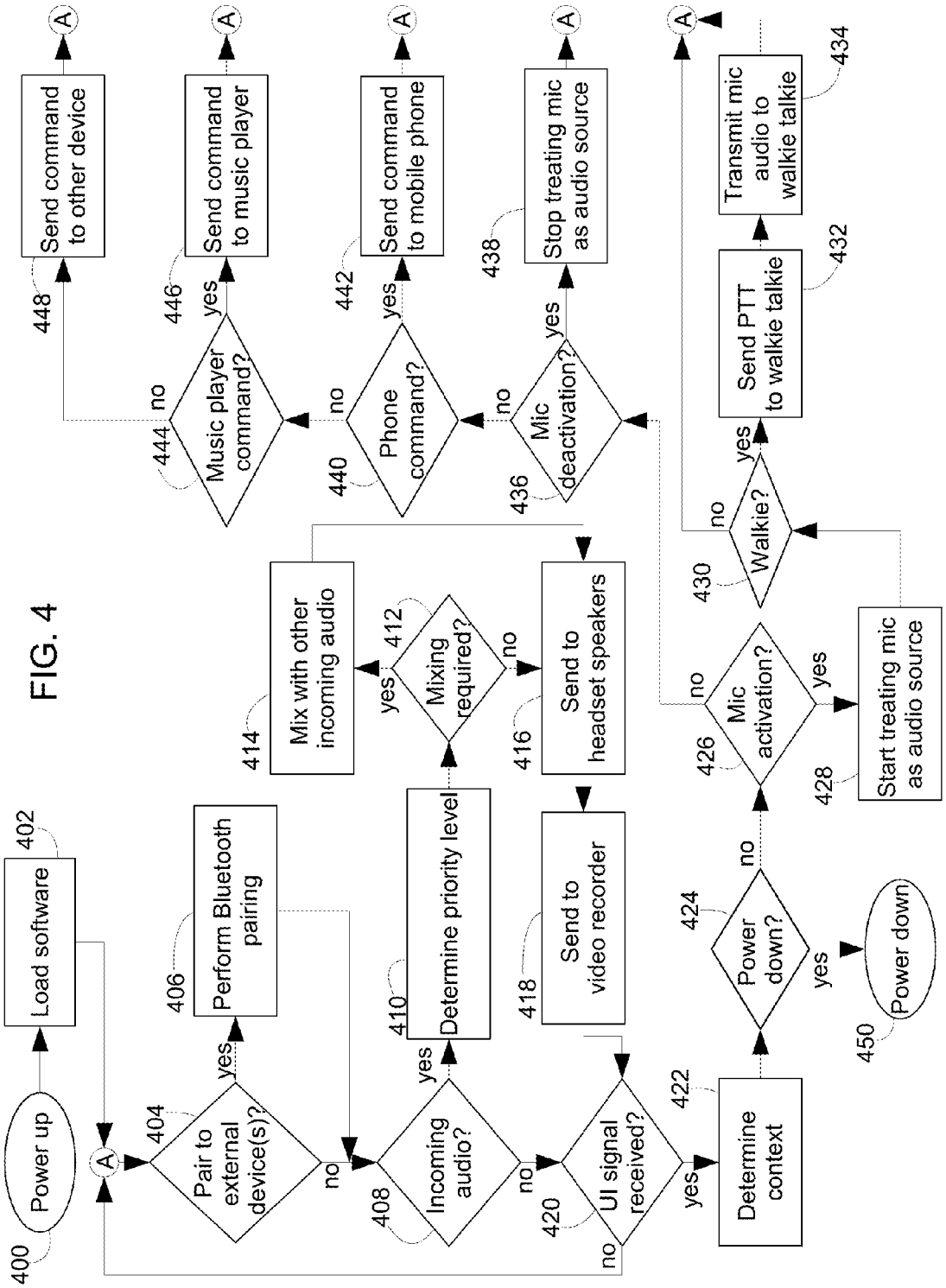
FIG. 4 illustrates a flowchart describing operations performed by the audio control apparatus according to an exemplary embodiment.

FIG. 4 illustrates a flowchart describing operations performed by the audio control apparatus 102 according to an embodiment. The steps of the flowchart in FIG. 4 are not restricted to the exact order shown, and, in other embodiments, shown steps may be omitted or other intermediate steps added. In this embodiment, the processor 118 executes the control software 144 stored in the storage device 142 in order to cause the audio control apparatus 102 to perform the illustrated steps.

Prior to beginning the flowchart of FIG. 4, wired devices such as the video recorder 132, walkie talkie 138, and external UI may be manually connected to the audio control apparatus 102 by the user. Such wired connections are shown in the example diagram of FIG. 3.

At step 400, the audio control apparatus 102 is turned on. The electronic components including the processor 118 and memory of the audio control apparatus 102 receive electrical power from the onboard battery 140.

At step 402, the processor 118 loads and begins executing the control software 144. The audio control apparatus 102 boots up.

At step 404, the processor 118 evaluates if there is a requirement to pair with an external device. For instance, pairing may be manually triggered by the user holding the down the minus UI button 212, 222 for greater than three seconds to force the pairing process to begin. Automatic pairing may also be triggered by the processor 118 such as to re-pair with a previously paired device. For instance, if the Bluetooth link has been lost, a repairing process may be automatically performed to repair the link.

At step 406, the processor 118 and the Bluetooth communication interface 124 pair to one or more external device(s) including mobile phones 134, music players 136, video recorders 132, walkie talkies 138, external UIs 116, and/or other electronic devices. Standard Bluetooth pairing processes can be utilized at this step; as Bluetooth pairing is well-known in the art further description of the pairing process is omitted for brevity.

At step 408, the processor 118 evaluates whether a new incoming audio signal is received from one or more of the audio source devices 104. For example, with reference to FIG. 1, incoming audio signals may be received from the mobile phone 134, the music player 136, or the walkie talkie 138. Furthermore, in some configurations, the mic 112 (either provided on the integrated UI 108 and/or the external UI 116) may also act as an incoming audio source and provide an audio signal. In the embodiment illustrated in FIG. 4, the mic 112 is only treated as an audio source device 104 during times when the mic 112 has been specifically activated by the user at step 426. See further description below of steps 426, 428, 436, 438.

At step 410, the processor 118 determines a priority level of the new incoming audio signal detected at step 408. For example, the music player 136 may have a lowest priority level, the mobile phone 134 may have a medium priority level, and the walkie talkie 138 and mic 112 may each have a highest priority level.

At step 412, the processor 118 evaluates whether mixing of two or more simultaneously received audio signals is required according to the priority levels determined at step

410. For example, mixing may depend on whether there is incoming music only, or if there is music plus mobile phone 134 audio and/or walkie talkie audio. In some embodiments, if a first incoming audio signal has a higher priority than a second incoming audio signal, the two audio signals will be mixed together by the processor 118 but the first audio signal will be given a higher magnitude by the processor 118 and therefore sound louder than the second audio signal. Alternatively, in other embodiments, higher priority audio sources may be configured to cut in over top of lower priority audio sources. In such case the processor 118 will not mix in the higher priority audio signal but will instead exclusively send only the higher priority audio signal to the headphone speakers 114 and/or video recorder 132.

At step 414, the processor 118 mixes together the appropriate two or more audio signals to form a mixed audio output signal. For instance, incoming music received from the mobile phone 134 or music player 136 may be mixed together with incoming audio from the walkie talkie 138 (possibly with the audio from the walkie talkie 138 given a higher magnitude so that it is louder), but when incoming phone audio is received the phone call's audio will have a higher priority level that cuts off the music and walkie audio signals during the duration of the call.

When step 414 is performed during the time that the mic 112 is activated (i.e., after the mic 112 starts being treated as an audio source at step 428), the processor 118 mixes the incoming mic audio with one or more separate audio signals (for example, music, phone, and/or walkie talkie). The purpose of mixing these other audio sources along with the mic audio is to enable recording the user's voice on the video recorder 132 (or other audio sink device 122) along with music (and other audio) currently being listened to by the user. Alternatively, if mic audio mixing is not enabled during the time that the mic is activated, the processor 118 will transmit only the mic 112 audio to the video recorder 132. In this way, the video recorder 132 will capture only the user's audio as picked up by the mic 112 even if the user is currently listening to music.

Different combinations and permutations of which audio sources will be mixed together can be utilized in different embodiments, and these settings may be user-configurable settings stored in the data 146 of the storage device 142.

At step 416, the processor 118 sends the mixed or unmixed audio signal (depending upon whether mixing was required at step 412) to the speakers 114 so that the user is able to hear the audio. For instance, if two or more audio signals with different priority levels are mixed and sent to the speakers 114, the audio signal with the higher priority may be of greater volume. Likewise, if a higher priority audio signal is received that does not require mixing such as a phone call, just the higher priority audio signal is sent to the speakers 114. In another example, the processor 118 may transmit only the mic audio signal and not the other audio signal(s) to the video recorder 132 in response to receiving the activation signal.

At step 418, the processor 118 in this embodiment sends the same audio that was sent to the speakers 114 to the audio sink device(s) 106. For instance, assuming a single audio sink device 106 being a video recorder 132, the video recorder 132 is able to receive and record the same audio channels that the user hears played on speakers 114.

In other embodiments, the video recorder 132 and other audio sink devices 106 may have their own audio priority levels which can be separate and different from the speaker 114 priority levels. For instance, the user may wish to only hear audio from the walkie talkie 138 on the headset speakers 114 rather than mixing this with ongoing music. However, the user may wish to mix audio from the walkie talkie 138 with the music for output to the video recorder 132. In this way, the video recording of the activity will have continuous music and also record the audio from the walkie talkie 138. Again, the priority levels for both the speakers 114 and audio sink device(s) 106 may be user-configurable settings stored in the data 146 of the storage device 142.

At step 420, the processor 118 evaluates if a new UI signal has been received from either the integrated UI 108 or external UI 116. If no new UI signal has been received, control jumps back to step 404 via node (A); otherwise, the control proceeds to step 422 to begin processing the new UI signal.

At step 422, the processor 118 evaluates the context of the UI signal to determine the meaning of the UI signal. For example, if music is playing, the context of a particular UI signal such as pressing of a UI button 110 may be to stop the music. Alternatively, if the user's mobile phone 134 is ringing, the context of the particular UI signal may be to answer the mobile phone 134. Table 1 shown below illustrates examples of how different states of the audio control apparatus 102 can be used to determine the context and meaning of different incoming UI signals.

At step 424, the processor 118 checks whether the UI signal is a power down signal.

At step 426, the processor 118 evaluates whether the UI signal is a mic activation signal.

At step 428, the processor 118 activates the mic 112. In this embodiment, the internal mic 112 (and any external mic(s) 230) are not active by default. Instead, the user must press a certain button on the UI 108, 116 in order to activate the mic 112. The reason for this is to prevent the headset speakers 114 and the audio sink devices 106 from playing/recording ambient sounds and the user's voice picked up from the mic 112 unless deliberately desired by the user. In response to the mic activation signal being received at step 426, the mic 112 is activated by the processor 118 at step 428. In this way, the processor 118 treats the incoming mic audio similar to how it treats incoming audio from the audio source devices 104. During the time duration when the mic 112 is activated, audio from the mic 112 is processed by the processor 118 at steps 408 to 418 in order to possibly mix the mic audio with other audio being received, and to play the mic audio to the speakers 114 and send the mic audio to the video recorder 132 for capture. In this embodiment, during the time duration when the mic 112 is not activated, the mic 112 is not treated as an incoming audio source and the mic audio is ignored by the processor 118 (i.e., not sent to the speakers 114 and video recorder 132).

One exception to this default rule is with phone calls. Phone calls have bidirectional communication (full-duplex) and most users will not want to have to manually press a mic activation button during phone calls in order to have the other party hear the user's voice. For this reason, as soon as a phone call is established (either incoming or outgoing), the mic 112 is automatically activated and all sounds are automatically picked up by the mic 112 without pressing any extra UI buttons 110. The processor 118 will optionally mix the mic audio with other incoming audio according to the pre-configured priority levels at step 410. At the end of the call, the mic 112 is again disabled by default. The default mic activation settings may be changed by the user if desired.

At step 430, the processor 118 evaluates whether the mic activation UI signal determined at step 426 is a walkie talkie transmit signal. When the mic activation is for the walkie talkie 138, the processor 118 proceeds to step 432. Alternatively, if the mic activation UI signal is not for the walkie talkie 138 this means the mic activation is intended to allow the user to record their voice on the video recorder 132 (but not transmit it to another user via the walkie talkie 138). When the mic activation is not intended for the walkie talkie 138, control proceeds to step 436.

At step 432, the processor 118 controls the PTT communication interface 128 to send a push-to-talk (PTT) signal to the walkie talkie 138. As a result, the walkie talkie 138 begins to transmit a radio frequency (RF) signal.

At step 434, the processor 118 sends the user's audio content captured by the mic 112, 230 to the walkie talkie 138. Because the walkie talkie 138 is in transmit mode, the audio content is sent out over-the-air. In some embodiments, the walkie talkie PTT activation UI signal may correspond to the user holding down the volume down button 212, 222 while the audio control apparatus 102 is in an idle state. When the user releases the button 212, 222, the PTT activation signal is ended, the processor 118 stops sending the PTT signal via the PTT communication interface 128 and the walkie talkie 138 therefore stops transmitting. In another configuration, the walkie talkie mic activation signal may start when the user presses a certain button on the UI 108, 116 and continue even after the user releases the button until the user presses the same button (or different button) again. This configuration may be beneficial to facilitate longer mic activations without requiring the user to hold down the button for the entire time. Mic activation detected at step 426 may also be done in a similar manner either using the same or different buttons as used for detecting walkie talkie PTT control at step 430.

At step 436, the processor 118 evaluates whether the incoming UI signal represents a mic deactivation command. The mic deactivation signal may correspond to the user releasing a certain button on the UI or may correspond to a second pressing of a button, or may correspond to a different button being pressed, etc.

At step 438, because the mic 112 has now been activated, the processor 118 stops treating the mic 112 as an audio source. Audio picked up from the mic 112 will no longer be passed to the speakers 114/video recorder 132 at steps 416, 418.

At step 440, the processor 118 evaluates the UI signal to determine whether it is a phone command. For example, if the context is such that the mobile phone 134 is ringing, the new UI signal may mean the user wants to answer the phone call. In another example, if the user is on a call and a new UI signal is received, the context of the phone call may mean that the UI signal is a phone command to end the call.

At step 442, the processor 118 sends a Bluetooth command to the mobile phone 134 via the Bluetooth communication interface 124. The Bluetooth command causes the mobile phone 134 to carry out the phone command determined at step 440. As previously mentioned, when calls are started and ended, the processor 118 also activates and de-activates the mic 112, respectively.

At step 444, the processor 118 evaluates the UI signal to determine whether it represents a music player command. Examples of music player commands include start music, pause music playback, skip song, repeat song, volume up/down, etc.

At step 446, the processor 118 communicates with the music player 136 via the Bluetooth communication interface 124 to send the command determined at step 444 to the music player 136. For example, in response to receiving a play signal from the UI 108, 116, the processor 118 will send a play music command to the music player 136.

At step 448, the processor 118 communicates with other type(s) of device(s) to send the appropriate commands. Step 448 is intended to illustrate that although the previous examples have focussed on controlling mobile phones 134 and music players 136, other types of devices can also be controlled according to user input on the integrated or external UI 108, 116 in a similar manner. For instance, the audio sink device 122 (video recorder 132) may be stopped and started via a command sent from the integrated UI 108 and external UIs 116. Another example may be an audio recorder. Likewise, other devices carried by the user that are neither audio source 104 nor audio sink 122 devices may also be controlled in a similar manner. For instance, a beacon device may be started or stopped according to signals received from the integrated UI 108 and external UIs 116.

At step 450, the audio control apparatus 102 shuts down.

Table 1 shows an example of how three UI buttons, Minus (−), Center (C) and Plus (+), on the UI 108, 116 behave in different contexts as determined at step 422 of FIG. 4. In this configuration, action taken when one or more of the buttons 210, 212, 214, 220, 222, 224 are pressed depends on the operating state of the audio control apparatus 102.

TABLE 1

| | | Button event operations | | | |
|---|---|---|---|---|---|
| State | Operation | Minus (−) | Center (C) | Plus (+) | Comments |
| Unpowered | Power Up | | | X | Hold button down for greater than 3 seconds to power up |
| Idle | Power Down | | | X | Hold button down for greater than 3 seconds to force power down. |
| Idle | Reset Pairing List | X | | X | Hold buttons down for greater than 3 seconds to force reset previous known pairings. |
| Idle | Music Start | | X | | Hold/Release button less than 2 seconds to start music |
| Idle | Enter Voice Command | | X | | Hold button for greater than 2 seconds to enter Voice Command state (e.g. iPhone ® Siri ®) |
| Idle | Walkie Talkie PTT | X | | | Hold down button to activate walkie talkie talk path. (PTT) |
| Music Playing | Music Pause/Stop | | X | | Hold/Release button less than 2 seconds to pause music, and enter Idle state |
| Music Playing | Enter Voice Command | | X | | Hold button for greater than 2 seconds to enter Voice Command state |
| Music Playing | Volume Down | X | | | Hold/Release button less than 1 second to reduce music volume |

TABLE 1-continued

Button event operations

| State | Operation | Minus (−) | Center (C) | Plus (+) | Comments |
|---|---|---|---|---|---|
| Music Playing | Volume Up | | | X | Hold/Release button less than 1 second to increase music volume |
| Music Playing | Song Previous | X | | | Hold button greater than 1 seconds to move back a song |
| Music Playing | Song Next | | | X | Hold button greater than 1 seconds to move forward a song |
| Voice Command | Exit Voice Command | | X | | Hold/Release button less than 1 second to exit Voice Command state, and return to previous state |
| Active Call | Volume Down | X | | | Hold/Release button less than 1 second to reduce call volume |
| Active Call | Volume Up | | | X | Hold/Release button less than 1 second to increase call volume |
| Active Call | Mute/Unmute | X | | | Hold button down for at least 2 seconds to mute/unmute call |
| Active Call | Hangup Call | | X | | Hold/Release button less than 1 second to hangup on call |
| Incoming Call | Call Answer | | X | | Hold/Release button within 1 seconds to answer an incoming call |
| Incoming Call | Call Reject | X | | | Hold button for greater than 1 second to reject an incoming call |
| Incoming Call Waiting | Call Waiting Answer | | X | | Hold/Release button within 1 seconds to answer an incoming call waiting |
| Incoming Call Waiting | Call Waiting Reject | X | | | Hold button for greater than 1 second to reject an incoming call waiting |

Figure 5:
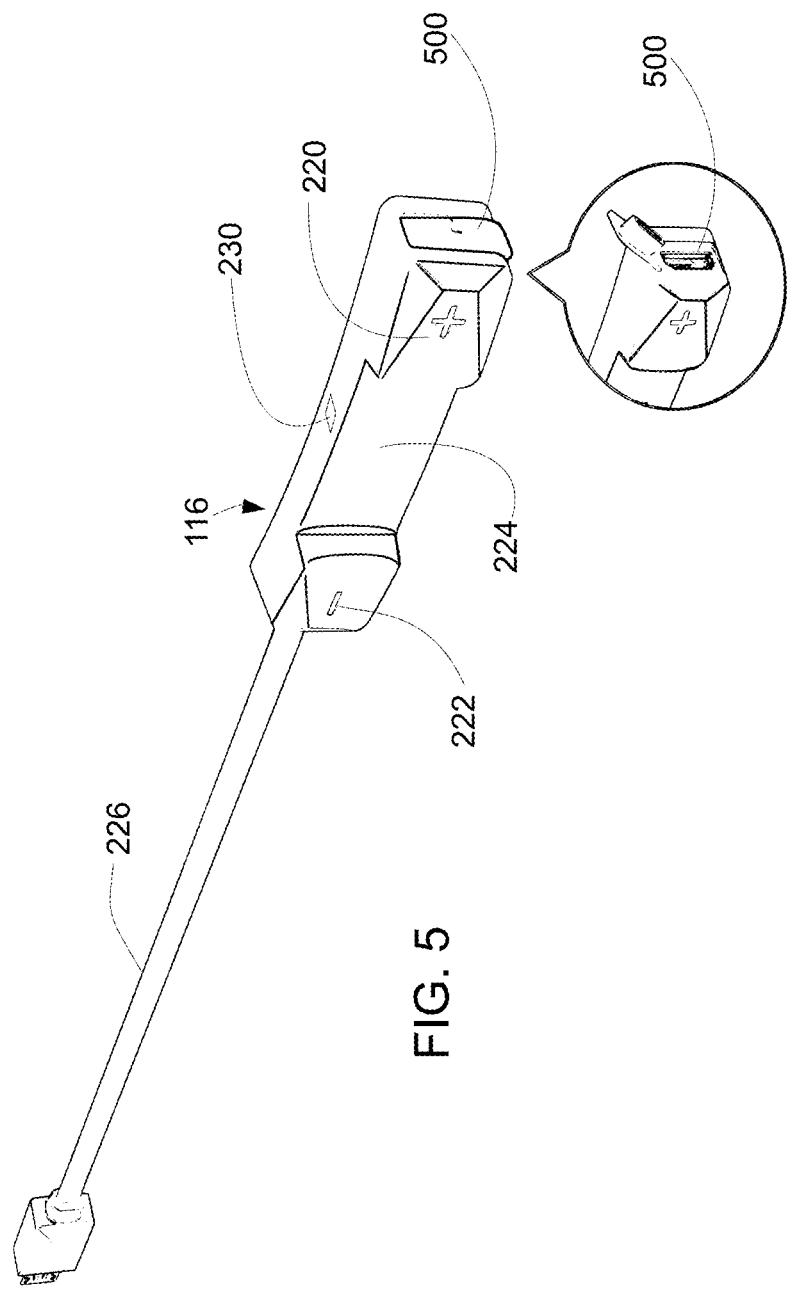
FIG. 5 illustrates the external UI of FIG. 1 having a USB port preventing the need for the headset to removed from the user's helmet when charging the battery according to an exemplary embodiment.

FIG. 5 illustrates an external UI 116 having a USB port 500 according to an exemplary embodiment. The USB port 500 is closed during normal operation; however, as shown in the exploded view, may be opened in order to charge the battery 140 of the audio control apparatus 102. Since the external UI 116 is mounted somewhere easily accessible to the user such as on the outside of the helmet, the USB port 500 allows for convenient charging without removing the left or right headset parts 200-L, 200-R from the helmet.

Although the invention has been described in connection with preferred embodiments, it should be understood that various modifications, additions and alterations may be made to the invention by one skilled in the art without departing from the spirit and scope of the invention. For example, although the mic activation and deactivation signals at step 426 and 436 were described above as being manually triggered in response to user input, other types of mic activation and deactivation signals can be used instead. For example, the processor 118 may automatically trigger generation of the activation signal and/or deactivation signal in response to different event occurrences. The user can set the timer 148 so that it can engage the audio control apparatus 102 to start sending audio to the video recorder 132 after a given waiting period set by the timer. Alternatively, sensors 150 may be used to trigger the audio control apparatus 102 to start sending audio to the video recorder 132 based on specific sensor feedback. For the GPS sensor 152, the audio control apparatus 102 may start sending audio to the video recorder 132 based upon the crossing of a geo-fence. For the altimeter sensor 154, the audio control apparatus 102 may start sending audio to the video recorder 132 based upon ascending/descending to a predetermined altitude (which may be useful for downhill skiers). For the accelerometer 156, the audio control apparatus 102 may start sending audio to the video recorder 132 based upon exceeding a predetermined amount of force/acceleration for a predetermined length of time (which may be useful for either downhill skiers or mountain bicycling on bumpy terrain). The accelerometer sensor 156 gives an indication to the audio control device 102 that the user has begun to engage in their outdoor activity, and the user would not have to press a UI button 110 to begin recording.

The processor 118 may also automatically prevent or adjust audio source mixing and transmission to the speakers 114 based on sensor input. For instance, the processor 118 may mute/attenuate the user headset speakers 114 based on sensor feedback exceeding a particular threshold. In one example, if the accelerometer 156 detects a force or spin greater than a certain threshold, this may mean the user is currently doing a big ski jump, flip, etc. The processor 118 therefore blocks out any incoming calls, walkie talkie reception, etc. for a predetermined time period measured by the timer 148 or until the accelerometer 156 detects the end of the trigger force.

A benefit of utilizing a wired connection 302 between the walkie talkie and the audio control apparatus 102 in some embodiments is that the PTT command and mic audio sent by the audio control apparatus 102 is received by the walkie talkie 138 in a timely manner. A wireless connection such as Bluetooth low energy may be used instead of wired connection 302 in other embodiments, but care should be taken to avoid lag on establishing the wireless connection upon mic activation. To save battery power, some wireless protocols such as Bluetooth will enter a sleep mode and will have an appreciable lag upon wakeup. The lag could cut off the first part of a user's speech during Bluetooth wakeup. Solutions to this problem include configuring the processor 118 to keep the wireless connection in an active mode, or providing additional buffer memory in the audio control apparatus 102 to store the first part of the user's speech during Bluetooth wakeup.

Likewise, either a wired connection or a wireless connection may be utilized to connect between the audio control apparatus 102 and the audio sink devices 106 such as an external GoPro™ video recorder 132. To enable stereo audio such as from music players and/or stereo mics 112, Bluetooth Advanced Audio Distribution Profile (A2DP) may be utilized. This also allows for the processors 118 to play different audio on different stereo channels (right/left channels) in different modes such as to create the conversation effect described further below.

The user can change the settings of the UI buttons 210, 212, 214, 220, 222, 224 using an app on their mobile phone 134 or another computing device. Uses of this app include changing the settings of the context specific buttons, audio priority levels, mixing requirements, volume threshold, sensor mic triggers, mic activation and deactivation, actions of all user buttons, external device commands and types, Bluetooth pairings, etc.

Rather than using hard buttons (i.e., physical buttons), soft buttons may be used for either UI 108, 116. For example, soft buttons may be located on the user's mobile phone, and the audio control apparatus 102 can be controlled by the user interacting with the soft buttons on the user's mobile phone. Like the hard buttons, the soft buttons may be user-configurable using the mobile phone app.

The audio control apparatus 102 can be configured to provide audio feedback. The audio control apparatus 102 can also be configured to provide haptic feedback. These and other types of feedback such as visual feedback help the user understand that an action has successfully occurred. For example, a voice message played to the user by the processor 118 on speakers 114 may indicate that pairing has been established, a call has been concluded, etc.

Mic activation and deactivation signals may originate from a user interface (UI) 108, 116, or may originate from audio picked up from the microphone 112 when it exceeds a threshold magnitude (voice activated command recognized by the processor 118).

Although described in connection with sending an audio signal to a video recorder 132, the audio control apparatus 102 can also be used in conjunction with other media signals. For example, sending a video call from the mobile phone 134 such that both the audio and video signal are sent to the video recorder 132, possibly as a picture in picture (PIP).

Rather than performing software based mixing, the processor(s) 118 may be supplemented or replaced at step 414 with a separate audio mixer chip 232 or circuit to perform the mixing in hardware utilizing either analog or digital signals. Although not shown in FIG. 1, it is to be understood that the separate audio mixer chip 232 should have audio connections running to each of the communication interfaces for source/sink audio devices 106, 104 in addition to the mic 112 (both internal and external) and the speakers etc. Likewise, analog-to-digital and digital-to-analog converters may be included as required depending on the types of communication interfaces and capabilities of external devices 106, 104, 116. Audio signals may be represented as digital signals or analog signals accordingly. In some embodiments the mic 112 and speakers 114 may also have direct physical links to the Bluetooth circuit 124. In general, components shown in FIG. 1 may be connected in any suitable manner along with other components (not shown) to support the operations as described herein.

Audio source devices 104 and audio sink devices 106 may operate in dual roles. For instance, a mobile phone 134 may operate both to source audio such as phone calls and music and also to sink audio such as recording the audio provided by the audio control apparatus 102 on sink communication interface 122 similar as described above for the video recorder 132. Again, the mobile phone 132 may be connected via Bluetooth and therefore both source and sink audio via the Bluetooth interface 124.

The left and right headset sides 200-L and 200-R may be switched in other implementations, and components of the audio control apparatus 102 may be located within either side of the headset part 200-L, 200-R as desired. The external UI 116 may be installed anywhere convenient to the user, such as mounted on a left/right/front/back of a helmet.

Although the above speakers 114 are shown in FIG. 2 as being a headset, speakers 114 can also be implemented as earphones or ear buds in other configurations. Likewise, it is not a requirement that the audio control apparatus 102 be implemented as a headset. Instead, in other configurations the audio control apparatus 102 may omit the integrated UI 108 and instead simply connect to an external UI 116. In some embodiments, the external UI 116 is a typical Bluetooth headset with mic. In this way, the audio control apparatus 102 may be a standalone box that can be stored in a backpack or on a belt, while the user listens to and interacts with their Bluetooth headset. Buttons on the Bluetooth headset correspond to UI events for processing by the audio control apparatus as described in FIG. 4. The user can thereby cause the mic audio to be treated as an audio source and be recorded on the video recorder, operate their walkie talkie 138, phone 134, music player 136, and other devices from the Bluetooth headset even though the Bluetooth headset is only paired with the audio control apparatus 102.

The illustrations within show only one internal mic 112, or one external mic 230, suggesting mono; however, other embodiments can have multiple microphones for stereo. The processor 118 and/or audio mixer 232 may also mix stereo sound sources with mono sound sources for output to the stereo speakers 114. For instance, music received from the music player 136 may be stereo while audio from the mic 112 is mono.

In some embodiments, the processors 118 may create a conversation effect for capture by the audio sink device 106 (e.g., video recorder 132) by taking advantage of the fact that a stereo audio signal has two distinct channels. By making one party's voice louder out of one side than the other party's audio, the processor's may achieve a conversation effect. For example, one conversation effect involves the processors 118 transmitting audio captured by the mic 112 (i.e., the user's own voice) only on one channel such as the left side of the stereo audio output and transmitting audio received from the audio source device 104 (e.g., the other party on a phone call or walkie talkie conversation) only on the other channel such as the right side of the stereo audio output. For instance, audio received from the other party (RX audio) is sent by the processors 118 to the audio sink device 106 on a first stereo channel and audio transmitted to the other party (TX audio) is sent by the processors 118 to the audio sink device 106 on a second stereo channel. Since the audio signal sent to the audio sink device 106 has the user's voice on an opposite channel as the other party's voice, during later playback of the video, it is easy for the viewer to distinguish the two sides of the conversation because the local and remote audio will be played on different sides. In particular, the remote party's voice will come from one speaker side and the local party's voice will come from the other speaker side.

In some embodiments, rather than the fully splitting the RX/TX audio signals to different stereo channels, the conversation effect is achieved by sending a higher amplitude/magnitude of the RX audio on one stereo channel than the TX audio sent on that side. Likewise, the processors 118 send a higher amplitude of the TX audio on the other stereo channel than the RX audio sent on that side. In this way, even though both the remote and local audio is transmitted on both stereo channels (i.e., left/right sides), the remote party's voice will still be louder on one side (e.g., the left side) during video playback than the local party's voice played out of that side. Likewise, the local party's voice will be louder on the other side (e.g., the right side) during video playback than the remote party's voice played out of that side.

In some embodiments, the conversation effect is achieved by sending the RX audio signal to the a first stereo channel of the audio sink device 106 without any attenuation and sending the RX audio signal to a second stereo channel of the audio sink device 106 with a predetermined level of attenuation. Likewise, the TX audio signal is sent to the second stereo channel of the audio sink device 106 by the processors 118 without any attenuation and the TX audio signal is sent to the first stereo channel of the audio sink device 106 with the predetermined level of attenuation. In this way, the user's own voice (i.e., the TX audio) will be louder on the second stereo channel during play back and the other party's voice (i.e., the RX audio) will be louder on the first stereo channel during play back.

The conversation effect is particularly useful during video playback when the two parties have similar sounding voices or the conversation involves multiple people talking at each side. However, in some embodiments, the audio output by the processors 118 to the right and left speakers 114-R, 114-L may be different than that outputted to the audio sink device 106 by not employing the above conversation effect on the sound sent to the speakers 114-R, 114-L. In other words, the processors 118 may simply send the received audio from both the audio source device 104 and/or the mic 112 to both the right and left side speakers 114-R, 114-L. In this way, the actual user of the audio control apparatus 103 will be able to hear the other party in both ears. As with all settings, whether to employ the conversation effect on the audio output to either the audio sink device 106 and/or headset speakers 114-L, 114-R can be set in some embodiments according to user controllable settings.

The processors 118 may dynamically enable and disable the conversation effect depending on the operating context of the audio control apparatus. For instance, the processors 118 may automatically enable the conversation effect upon a phone call being answered or initiated at step 442. In another example, the processors 118 may automatically enable the conversation effect upon the push-to-talk signal being sent to the walkie talkie at step 432. The processors 118 may also dynamically enable and disable the conversation effect depending on the source of an audio signal. For instance, the conversation effect may be automatically enabled when an audio signal is received from the walkie talkie. In yet another example, the processors 118 may dynamically enable or disable the conversation effect in response to receiving user input at the user interface 130, 116.

The PTT communication interface 128 and the walkie talkie audio 126 may be combined into a single port for connection to the walkie talkie 138. A splitter cable may be used to couple the two devices to allow for a single port on the audio control apparatus 102 to be connected to two separate ports (i.e., MIC and Speaker) on the walkie talkie 138.

In yet another example of modification, any of the above-described wired connections can be changed to a wireless connection and vice versa depending on the device require-ments and capabilities. For example, a Bluetooth walkie talkie or a Bluetooth enabled video recorder could wirelessly couple to the audio control apparatus via a Bluetooth circuit 124.

In another embodiment, the mic 112 may be active by default; however, disabled temporarily by the processor 118 in response to receiving a mute voice signal from the UI 106, 112 (or an automated mute voice signal generated by the processor 118 or another device). For instance, mic activation at step 426 may be automatic at power-up as long as there is an audio sink device 106 such as a GoPro™ video recorder 132 connected and recording. Thereafter, mic deactivation at step 436 may only be triggered by the processor 118 when a mute signal is optionally received from the UI 108, 116, or in response to different modes of the audio control apparatus 102. As an example, mic deactivation may automatically be performed when the user is utilizing the mic 112 to engage in a phone call with mobile phone 134. In yet other embodiments, mic activation at step 426 may always be true and step 426 is removed from the flowchart so that there is no mic deactivation. In such embodiments, the mic 112 will always be treated as an audio source device 104. Muting of the mic 112 may also be performed in other ways such as via a hardware switch connected inline in the mic 112 audio inputs in order to selectively pass or block audio signals from the mic 112 reaching the processor 118 (or audio mixer chip 232).

The control apparatus 102 may also be utilized to control any number and type of external devices 106, 104 rather than just the ones shown in FIG. 1. Additionally, the control apparatus 102 may control some devices indirectly via another intermediate device. For instance, rather than communicating directly from the control apparatus 102 to the external vide recorder 132 as is illustrated in FIG. 1, the video recorder 132 may be wirelessly coupled to the user's mobile phone 134 and the control apparatus 102 communicates with the video recorder 132 via the user's mobile phone 134. In this way, the user's mobile phone 134 may act as a hub to which several other devices are coupled and made accessible. Other types of hubs and switches may be utilized as desired in other configurations.

Examples of the non-transitory computer-readable medium implementing the storage device 142 for storing the control software 144 and data 146 include optical media (e.g., CD-ROM, DVD discs), magnetic media (e.g., hard drives, diskettes), and other electronically readable media such as flash storage devices and memory devices (e.g., RAM, ROM). Combinations of these media may be employed such as software being stored in non-volatile flash memory and copied and executed in RAM during operation. The computer-readable medium may be local to the portable computing device executing the instructions, or may be remote to this computing device such as when coupled to the computing device via a computer network such as the Internet. The processor may be included in a general-purpose or specific-purpose computing device that becomes the audio control apparatus as a result of executing the instructions.

In other embodiments, rather than software stored in a storage device and executed by one or more processors, the above flowchart and described functionality may be implemented as hardware modules operable to perform the above-described functions. Examples of hardware modules include combinations of logic gates, integrated circuits, field programmable gate arrays, and application specific integrated circuits, and other analog and digital circuit designs. Unless otherwise specified, features described may be implemented in hardware or software according to different design requirements.

All combinations and permutations of the above described features and embodiments may be utilized in conjunction with the invention.

What is claimed is:

1. An audio control apparatus comprising:
   one or more communication interfaces for coupling to:
   an audio source device;
   a radio transceiver;
   a speaker;
   a microphone; and
   a user interface; and
   one or more processors coupled to the one or more communication interfaces;
   wherein, by the one or more processors executing software instructions loaded from a memory, the one or more processors are configured to:
   receive a start signal from the user interface;
   transmit a start command to the audio source device in response to receiving the start signal;
   receive a first audio signal representing audio sent from the audio source device in response to the start command;
   transmit the first audio signal to the speaker;
   receive a second audio signal representing audio from the radio transceiver;
   mix the first audio signal and the second audio signal together to form a mixed audio signal and transmit the mixed audio signal to the speaker; and
   pass a microphone signal representing audio from the microphone along with a push-to-talk command to the radio transceiver in response to receiving a push-to-talk signal from the user interface;
   whereby, upon receiving the push-to-talk command, the radio transceiver transmits the microphone signal over the air.

2. The audio control apparatus of claim 1, comprising:
   a Bluetooth communication interface for coupling to the audio source device;
   wherein the speaker and the microphone form a Bluetooth headset.

3. The audio control apparatus of claim 2, further comprising the user interface integral to an enclosure of the Bluetooth headset.

4. The audio control apparatus of claim 2, further comprising the user interface mounted external to an enclosure of the Bluetooth headset.

5. The audio control apparatus of claim 1, wherein the one or more communication interfaces at least include a connection port for wired connection to the radio transceiver.

6. The audio control apparatus of claim 1, wherein:
   the start signal and the push-to-talk signal are both triggered by a same button on the user interface; and
   the one or more processors are configured to distinguish between the start signal and the push-to-talk signal based on a context mode tracked by the one or more processors.

7. An audio control apparatus comprising:
   one or more communication interfaces for coupling to:
   an audio source device;
   an audio sink device;
   a speaker; and
   a microphone; and
   one or more processors coupled to the one or more communication interfaces;
   wherein, by the one or more processors executing software instructions loaded from a memory, the one or more processors are configured to:
   receive an audio signal representing audio from the audio source device;
   transmit the audio signal to the speaker;
   transmit the audio signal to the audio sink device;
   receive a microphone signal representing audio from the microphone; and
   mix the microphone signal and the audio signal together to form a mixed audio output signal and transmit the mixed audio output signal to the audio sink device in response to receiving an activation signal.

8. The audio control apparatus of claim 7, wherein:
   the one or more communication interfaces are further for coupling to a user interface (UI) from which the activation signal is received; and
   the user interface allows a user to manually trigger generation of the activation signal.

9. The audio control apparatus of claim 7, wherein the one or more processors are further configured to automatically trigger generation of the activation signal in response to an event occurrence.

10. The audio control apparatus of claim 7, comprising:
    a Bluetooth communication interface for coupling to the audio source device;
    wherein the speaker and the microphone form a Bluetooth headset.

11. The audio control apparatus of claim 7, wherein the audio source device is a mobile phone and the audio signal includes a voice of a remote party on a call established with the remote party utilizing the mobile phone.

12. The audio control apparatus of claim 7, wherein:
    the audio sink device is a video recorder with an external microphone input; and
    when transmitting to the audio sink device, the one or more processors are configured to transmit to the external microphone input of the video recorder.

13. The audio control apparatus of claim 7, wherein, when transmitting to the audio sink device, the one or more processors are configured to create a conversation effect by:
    sending a first audio signal to the audio sink device on at least a first audio channel, the first audio signal being the audio signal received from the audio source device;
    attenuating any amount of the first audio signal sent to the audio sink device on a second audio channel such that the amount of the first audio signal sent to the audio sink device on the second audio channel is less than that sent on the first audio channel;
    sending a second audio signal to the audio sink device on at least the second audio channel, the second audio signal being the microphone signal received from the microphone; and
    attenuating any amount of the second audio signal sent to the audio sink device on the first audio channel such that the amount of the second audio signal sent to the audio sink device on the first audio channel is less than that sent on the second audio channel.

14. A headset system comprising:
    a speaker;
    a microphone;
    a memory storing one or more user settings and a plurality of software instructions;
    a first communication interface for coupling with an audio source device;
    a second communication interface for coupling with a walkie talkie;

a third communication interface for coupling to a video recorder;

a user interface accessible by a user of the headset system; and one or more processors coupled to the speaker, the microphone, the first communication interface, the second communication interface, the third communication interface, and the user interface;

wherein, by the one or more processors executing the software instructions loaded from the memory, the one or more processors are configured to send audio received from the audio source device, the microphone, and the walkie talkie to the speaker and the video recorder;

the one or more processors are further configured to send audio received from the microphone to the walkie talkie and send a push-to-talk command to the walkie talkie in response to user input received at the user interface; and the one or more processors are further configured to either mix or not mix audio received from the audio source device, the microphone, and the walkie talkie when sending to the speaker or the video recorder according to the one or more user settings.

15. The headset system of claim 14, wherein at least one of the first communication interface, the second communication interface, and the third communication interface is a Bluetooth wireless transceiver.

16. The headset system of claim 14, wherein the one or more processors are further configured to control operations of the audio source device via the first communication interface according to commands received via the user interface.

17. The headset system of claim 14, wherein the user interface is mounted external to an enclosure of the headset system.

18. The headset system of claim 14, wherein the audio source device is a mobile phone and the audio received from the audio source device includes a voice of a remote party on a call established with the remote party utilizing the mobile phone.

19. The headset system of claim 14, wherein:

the video recorder has an external microphone input; and when transmitting to the video recorder, the one or more processors are configured to transmit to the external microphone input of the video recorder.

20. The headset system of claim 14, wherein, when transmitting to the video recorder, the one or more processors are configured to create a conversation effect by:

sending a first audio signal to the video recorder on at least a first audio channel, the first audio signal being the audio received from the audio source device;

attenuating any amount of the first audio signal sent to the video recorder on a second audio channel such that the amount of the first audio signal sent to the video recorder on the second audio channel is less than that sent on the first audio channel;

sending a second audio signal to the video recorder on at least the second audio channel, the second audio signal being the audio received from the microphone; and attenuating any amount of the second audio signal sent to the video recorder on the first audio channel such that the amount of the second audio signal sent to the video recorder on the first audio channel is less than that sent on the second audio channel.

* * * * *